United States Patent Office 3,350,336
Patented Oct. 31, 1967

3,350,336
SUBSTITUTED ACRYLAMIDES, POLYMERS THEREOF, AND METHODS OF MAKING SAME
Everett J. Kelley, Moorestown, N.J., assignor to Rohm & Haas Company, Philadelphia, Pa., a corporation of Delaware
No Drawing. Filed Dec. 29, 1964, Ser. No. 422,050
9 Claims. (Cl. 260—22)

This invention relates to new compounds including addition polymerizable monomers and the polymers thereof. It is particularly concerned with lower aliphatic acrylamides substituted on the nitrogen atom with a di(carboalkoxyalkyl)aminomethyl group. The invention is also concerned with methods of producing the monomers and addition polymers thereof.

The monomeric compounds of the present invention have the general formula

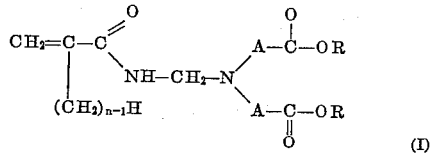

wherein $n$ is an integer having a value of 1 to 2,
A is an alkylene group having 1 to 3 carbon atoms, and
R is an alkyl group having 1 to 4 carbon atoms.

The compounds of Formula I may be made in any one of several ways. For example, a di(carboalkoxyalkyl)amine of Formula II may be reacted with an N-methylolacrylamide of Formula III

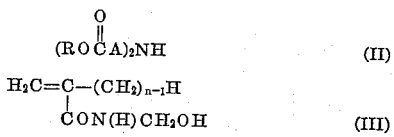

Both the compounds of Formula II and those of Formula III are known.

The reaction between II and III may be effected by dissolving the two reactants in a suitable inert solvent, such as ethylene dichloride, chloroform, carbon tetrachloride, cyclohexane, or an aromatic hydrocarbon, e.g. benzene, toluene, or xylene, and heating the mixture to a temperature of 50° C. up to boiling or reflux. A small amount of a polymerization inhibitor may be present in the reaction medium. A water-separator is used to return the solvent without the water. The extent of reaction is determined by the amount of by-product water generated in the system. The time required for completion of the reaction may be from 4 to 24 hours or more depending on the temperature, the reactant concentrations, and other factors. At the completion of the reaction, the solvent may be removed by distillation at normal or reduced pressures, and solid impurities may be removed from the product by filtration.

An alternative method is to react a mixture of a compound of Formula II with formaldehyde and either acrylamide or methacrylamide in an inert solvent containing a polymerization inhibitor and an alkaline catalyst, e.g. sodium or potassium hydroxide, sodium carbonate, or an alkali metal alkoxide, such as sodium methoxide, for the reaction between the amide and formaldehyde.

The compounds of Formula I are generally soluble in such organic solvents as those mentioned above for preparing them; also the lower aliphatic alcohols, such as methanol, ethanol, and isopropanol; esters such as ethyl acetate, butyl acetate, amyl acetate, and 2-butoxyethyl acetate; dimethylformamide, diethylformamide and acetonitrile.

As a chemical intermediate, the monomeric compounds of the present invention are adapted to react at the double bond with various compounds including alcohols, mercaptans, primary or secondary amines, nitroalkanes, malonates, acetoacetates, sodium bisulfite, and so on. The addition of long chain amines, or mercaptans, such as dodecylamine or mercaptan, provides compounds which are highly useful as water-proofing, softening and lubricating agents for textiles of all types and especially of cellulostic type including rayon and cotton, for leather and for paper.

The compounds of Formula I may be polymerized or copolymerized in bulk, in solution, or in either an emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. Although some of the compounds of Formula I have generally an appreciable solubility in water, all of the compounds of Formula I may be polymerized with or without other monomers by an emulsion technique in which the comonomers and any excess of the compound of Formula I over the amount that is soluble in the water are emulsified by non-ionic, cationic or anionic emulsifiers or suitable mixtures thereof. When persulfates are used as initiators as described hereinafter, stable latices are obtainable even without including an emulsifier initially in the polymerization system.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on.

Examples of vinylidene or monoethylenically unsaturated compounds that may be copolymerized with the compound of Formula I include vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylcarbazole, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, N-methacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, α-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

Copolymers may be prepared from about 0.2 to 99.9% by weight of at least one compound of Formula I with from 99.8 to 0.2% of at least one other ethylenically unsaturated monomer having a group of the formula $$H_2C=C<$$

Normally, the preferred copolymers are those formed exclusively of monoethylenically unsaturated copolymerizable molecules which give rise to thermoplastic, linear polymers. However, for some purposes, a small amount, e.g. from 0.1 to 25% by weight, based on the total weight of the monomeric material, of a polyethylenically unsaturated material, such as divinylbenzene, ethylene glycol dimethacrylate, butylene glycol dimethacrylate, or diallyl phthalate, may be included to increase the molecular size of the copolymer or to form a cross-linked product. Thus, up to 20% of such a polyethylenically unsaturated material may be mixed with methyl methacrylate (e.g. 75%) and a compound of Formula I (e.g. 5%) to form a molding composition which is mixed with a catalyst such as benzoyl peroxide and polymerized in a suitable mold by heating in conventional fashion. Preferred copolymers are those of copolymerizable monoethylenically unsaturated molecules having a group of the formula $H_2C=C<$ comprising about 1 to 10% by weight, based on the total monomer weight, of at least one compound of the Formula I.

Copolymers containing from about 0.5 to 20% by weight or more of the compounds of Formula I with various comonomers are adapted to provide valuable coating materials which may be pigmented or not, and may contain plasticizers or not, and in the case of emulsion copolymers, they are adapted to provide valuable water-base paints.

Examples of plasticizers that may be used are dibutyl phthalate, butyl benzyl phthalate, triphenyl phosphate, di-n-hexyl adipate, methyl abietate, ethyl phthalyl ethyl chromate, copper phthalocyanine blues and greens, zinc glycerol monoricinoleate. Examples of pigments include carbon black, titanium dioxide, ultramarine blue, lead chromate, copper phthalocyanine blues and grens, zinc chromate, zinc oxide, clays calcium carbonate, lead carbonate, and barium sulfate, iron oxides, toluidines, Prussian Blue, Chrome Yellow, Para Red Toners, Lithol Red, Cadmium Red, and chromium oxide.

Copolymers containing at least 1% and preferably from 5 to 20% by weight of a compound of Formula I with ethyl acrylate, butyl acrylate, or the like, are useful to reduce the shrinkage of wool. For this purpose, they may be applied in aqueous dispersions of a concentration from 10 to 30% so that from about 5 to 15% by weight of the copolymer is deposited on the wool fabric. After drying, the treated fabric may be heated to 240° F. to 350° F. for a period of one-half to fifteen minutes. The copolymers containing 1.2 to 5% or even up to 10 or 20% by weight of units derived from a monomer of Formula I are also excellent binders for non-woven fabrics of all types of material and synthetic fibers or filaments made by the air-deposition, carding, or garnetting of the fibers or filaments, such as those of rayon, wool, cellulose acetate and other esters and others, vinyl resins, polymers of acrylonitrile, poly(ethylene glycol terephthalate), glass, and other mineral fibers, and so on. For this purpose, there may be used from 5 to 150% by weight of the binder on the weight of fiber or even as high as 400% thereon. The treated fibrous material should be dried and then subjected to a bake, such as at 240° F. to 350° F. for a period of one-half to thirty minutes, to cure the polymer thereon. Similar aqueous dispersions made by the emulsion copolymerization of a monomer of Formula I with acrylic esters and especially butyl acrylate or ethyl acrylate are useful, with or without pigment, for the primary coating of leather. In this connection, the heteropolar group apparently exerts some chemical bonding action with the structure of the leather so as to provide good adhesion. Copolymers with acrylonitrile, especially those containing from 75 to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinylpyridine, when included in melts or solutions of polymers of acrylonitrile containing 75 to 90% acrylonitrile, such as copolymers thereof with vinyl chloride, vinyl acetate or the like, serve to modify the dyeing properties of fibers and films formed therefrom.

The copolymers may also be blended with other resins such as the aminoplast resin-forming condensation products mentioned above, vinyl or acrylic resins, such as polystyrene, polyvinyl chloride, polymethyl methacrylate, alkyds, cellulose esters and others, to form valuable coating compositions.

One of the outstanding advantages of the polymers of the present invention is their improved compatibility with other resins, such as polyester and polyamide condensates and especially the alkyds. Whereas polymers and copolymers of vinylaromatic hydrocarbons, such as styrene and vinyltoluenes, and alkyl esters of acrylic or methacrylic acid in which the alkyl group may have from 1 to 18 carbon atoms, such as methyl acrylate or methacrylate, ethyl acrylate or methacrylate, butyl acrylate or methacrylate, 2-ethylhexyl acrylate or methacrylate, and octadecyl acrylate or methacrylate, have limited compatibility with polyester resin condensates of alkyd or oil-modified alkyd type, the inclusion of as little as 3% by weight of a monomer of Formula I into such a vinylaromatic, acrylic or vinylaromatic/acrylic polymer or copolymer shows marked improvement in the compatibility of the copolymer with the alkyd and consequent improvement in clarity or transparency (unless pigmented) and gloss whether or not pigmented. Preferred copolymers for this purpose contain 5 to 15% of at least one monomer of the present invention. The copolymers are therefore useful components in oil-modified alkyds for reducing the tendency of films formed of the alkyds to yellow on ageing.

The polyester, polyamide, and polyester-polyamide condensation products with which the copolymers of the present invention have improved compatibility include reaction products of:

I. Glycols (or other polyols) and dibasic acids
II. Amino alcohols and dibasic acids
III. Glycols, diamines and dibasic acids
IV. Glycols, amino alcohols and dibasic acids
V. Amino alcohols, diamines and dibasic acids
VI. Amino acids, glycols and dibasic acids
VII. Amino acids, amino alcohols and dibasic acids
VIII. Amino alcohols, dibasic acids and hydroxycarboxylic acids
IX. Diamines and dibasic acids
X. Monoaminomonocarboxylic acids with themselves or each other It is advantageous to use a small excess of the alcoholic-hydroxyl-containing constituent in preparing the polymers.

Examples of polyols include trimethylol methane and erythritol. Examples of glycols are ethylene glycol, propylene glycol, diethylene glycol, trimethylene glycol, pentamethylene glycol, hexamethylene glycol, decamethylene glycol, dodecamethylene glycol, 1:12-octadecanediol and pentaglycol.

Examples of dibasic carboxylic acids are malonic, succinic, glutaric, adipic, β-methyladipic, pimelic, suberic, azelaic, sebacic, undecanedioic, brassylic, isophthalic, hexahydroterephthalic, p-phenylene-diacetic and acetone-dicarboxylic acid.

Any amino alcohol having at least one hydrogen atom attached to the amino nitrogen atom may be employed including aromatic amino alcohols, e.g. p-hydroxymethylbenzylamine, 4 - hydroxymethyl - 4-aminomethyldiphenyl and p-aminophenylethyl alcohols; aliphatic amino alcohols, e.g. 5-aminopentanol-1:6-amino-5-methyl-hexanol-1,4-(p-aminophenyl)cyclohexanol, hydroxyethoxyethoxyethylamine, and N - (β - aminoethyl)-N-(omega-hydroxyhexyl)aniline.

The preferred amino alcohols are of formula $$HO—R—NH_2$$

where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

Any diamine may be employed, which contains at least one hydrogen atom attached to each amino nitrogen atom.

The preferred diamines are of formula $NH_2RNH_2$ where R represents saturated divalent hydrocarbon radicals with a chain length of at least two carbon atoms, e.g., ethylenediamine, hexamethylenediamine, 3-methylhexamethylenediamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula HO—R—COOH where R represents saturated divalent hydrocarbon radicals, e.g., 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

The oil-modified alkyd type resin with which the copolymers are advantageously blended and have outstandingly improved compatibility may be defined generally as drying oil-modified linear polyester condensation product of at least one dicarboxylic acid selected from the group consisting of phthalic acid, isophthalic acid, terephthalic acid and saturated aliphatic dicarboxylic acids having 4 to 12 carbon atoms, with an aliphatic polyol having 2 to 6 carbon atoms, the amount of modified polyester being from 5 to 20% (preferably 10 to 15%) by weight of the total weight of polyester and monomer.

By the term "drying oil" it is intended to embrace semi-drying oils as well as those generally considered to be full drying oils. The modified alkyd or polyester may be made from the several components in conventional fashion. The proportion of oil may be from 35 or 40% to as high as 80% or more based on the entire weight of alkyd or polyester. The long oil alkyds having a 45 to 80% drying oil content are preferred. The molecular weight of the alkyd may be from 1,000 to 5,000 and is preferably about 2,500 to 4,000.

Alkyd resins of the type herein contemplated are produced by the interaction of at least three materials; namely, a dibasic acid, a polyhydric alcohol, and a drying oil or semi-drying oil fatty acid or alcoholized drying or semi-drying oil. Other modifying agents may be present in the reaction mass such as, for example, monocarboxylic acids, e.g., benzoic acid, crotonic acid, etc. The alkyds may also be modified with rosin or phenolic resins, or other well known materials. Two principal techniques have been developed for the preparation of the oil-modified alkyds, e.g., solvent method and fusion method. For the present purposes, the manner of producing the modified alkyd is relatively unimportant. Accordingly, where reference is made to a drying oil or semi-drying oil-modified alkyd herein, alkyds are contemplated whether produced by (a) the direct esterification reaction of semi-drying oil fatty acids with the dicarboxylic acid and the polyhydric alcohol or (b) the indirect esterification wherein a drying oil or semi-drying oil is first alcoholized with a polyhydric alcohol and thereafter esterified with a dibasic acid, under either of the principal techniques mentioned.

It is, of course, understood that multiple components may be present in the reaction mass, and instead of one drying or semi-drying oil, a mixture of drying or semi-drying oils and/or fatty acids, one or more dibasic acids, and one or more polyols may be used. The reaction may be carried out in the presence or absence of catalysts and in the presence or absence of solvents.

The unsaturated aliphatic drying oil or semi-drying oil acids are preferably those derived from naturally occurring oils of animal, vegetable or marine origin, particularly those derived from drying oils and semi-drying oils. These acids may be either non-conjugated or conjugated and may be employed as the monomer, dimer and/or trimer. Such preferred acids have an iodine value of from about 120 to about 425. Specific examples of unsaturated aliphatic acids useful in accordance herewith for the production of oil-modified alkyd resins are as follows:

TABLE I

| Fatty Acid | Empirical Formula | Natural Source |
|---|---|---|
| Hiragonic | $C_{16}H_{26}O_2$ | Japanese Sardine Oil. |
| Linoleic | $C_{18}H_{32}O_2$ | Cottonseed Oil. Soyabean Oil. Poppy Seed. Peanut Oil. Linseed Oil. Corn Oil. Perilla. Sunflower Seed. Sesame. |
| Iso-linoleic | $C_{18}H_{32}O_2$ | Castor Oil (dehydrated). |
| Linolenic | $C_{18}H_{30}O_2$ | Castor Oil (dehydrated). Linseed. Perilla. Hempseed. |
| Elaeostearic | $C_{18}H_{30}O_2$ | Tung. |
| Punicic | $C_{18}H_{30}O_2$ | Pomegranate. |
| Paranaric | $C_{18}H_{28}O_2$ | Seed Fats. |
| Arachidonic | $C_{20}H_{32}O_2$ | Brain, liver, blood and depot fats. |
| Clupanodonic | $C_{22}H_{34}O_2$ | Marine animal oils, e.g., menhaden. |
| Scoliodonic | $C_{24}H_{38}O_2$ | Marine animal oils. |
| Nisinic | $C_{24}H_{36}O_2$ | Do. |
| Tariric | $C_{18}H_{32}O_2$ | Seed Fat. |
| Licanic | $C_{18}H_{28}O_3$ | Oiticica oil |
| Abietic | $C_{20}H_{30}O_2$ | Rosin. Tall oil. |

Natural oils of the drying or semi-drying types, as exemplified above, are generally mixtures of glycerides of two or more of the acids named together with other glycerides, e.g., glyceryl oleate, glyceryl stearate and miscellaneous ingredients, e.g., phosphatides. Procedures for producing mixed acids of such oils are well known, e.g., "splitting" and such commercial acids are a preferred starting material. Thus there may be employed dehydrated castor oil fatty acids; linseed oil fatty acids, soyabean oil fatty acids, tung oil fatty acids, rosin acids, tall oil acids, etc., the individual purified and segregated acids contained therein, or the fatty acids named above and synthesized by known methods. Also as indicated such acids may be isomerized, or converted to the dimer or trimer prior to use herein. Polyethenoic acids of the conjugated, non-conjugated, or mixed conjugated, non-conjugated types may be used. In the preparation of coating composition vehicles, the drying oil fatty acids, and particularly the vegetable drying oil fatty acids are preferred.

Another of the essential components of the alkyd resins used in this invention is a polyhydric alcohol. These are aliphatic polyhydroxy compounds containing two or more hydroxy radicals. Those which may be used in accordance with this invention include for example, ethylene glycol, diethylene glycol, propylene glycol, glycerine, trimethylolethane, trimethylolpropane, pentaerythritol, polypentaerythritol, pinacol, arabitol, xylitol, sorbitol, mannitol, mixtures of these, etc.

Under certain circumstances it will be found desirable to use in conjunction with the polyol or mixture of polyols, a monohydric alcohol. Examples of such monohydric alcohols include hydroabietyl alcohol, soya fatty alcohols, etc.

The third essential component of the alkyds useful in this invention is a dibasic acid. Specific examples of dibasic acids and/or derivatives of polybasic acids useful alone or in admixture with another polybasic acid in accordance with this invention include the following: phthalic acid, phthalic anhydride, isophthalic acid, terephthalic acid (preferably in admixture with another dibasic acid), adipic acid, sebacic acid, tetrahydrophthalic anhydride, tetrachlorophthalic anhydride.

The most commonly used dibasic acid, is, of course, phthalic anhydride, alone or in admixture with one or more of the others listed above.

In accordance with well-known production techniques, the alkyds useful in accordance with this invention are preferably prepared having an oil length of from about 50% to about 80%. In general, acid values of the final alkyds are maintained at less than about 40 and preferably less than 20. The excess of hydroxyl groups over the available carboxylic acid groups as calculated in the admixing of the ingredients may range up to 50% over that theoretically required to react with the carboxyl content of the reaction mass. It may seem difficult of reconciliation that these materials have an acid number and at the same time an excess of hydroxyl. This may be explained by the fact that esterification occurs during heating of these reactants at elevated temperatures and if heating is carried on too far, gelation ensues. The product becomes solid and useless. Therefore, the "cook" is discontinued usually prior to complete reaction of all the carboxyl groups with available hydroxyl groups. Thus the product has an acid value; at the same time it contains what may amount to an excess of hydroxyl.

In the examples given later in the specification, reference will be had to certain oil-modified alkyds in terms of the ingredients inter-reacted to produce them. It will be understood that customary alkyd formation techniques are employed and that the products have oil lengths, acid values and hydroxyl contents within the ranges above specified.

Among the wide variety of oil modified or oil-acid modified alkyds useful in accordance herewith are the following:

TABLE II (1) 52% linseed oil, pentaerythritol, phthalate
(2) 60% soya bean oil, pentaerythritol, phthalate
(3) 52% soya-tung, glyceryl phthalate-phenolic modified
(4) 39% linseed glyceryl phthalate alkyd
(5) 45% oil (1:1 linseed-oiticica) glyceryl phthalate alkyd
(6) 33% linseed glyceryl phthalate-rosin modified
(7) 72% linseed pentaerythritol isophthalate
(8) 80% linseed pentaerythritol isophthalate
(9) 70% dehydrated castor pentaerythritol phthalate
(10) 66% linseed pentaerythritol phthalate
(11) 52% oil (4:1 soya-dehydrated castor) pentaerythritol phthalate
(12) 52% linseed pentaerythritol phthalate-benzoate (7:1)
(13) 52% linseed pentaerythritol-trimethylolethane (1:1) phthalate
(14) 52% linseed trimethylolethane phthalate
(15) 75% linseed trimethylolethane terephthalate
(16) 40% soya trimethylolethane phthalate-fumarate (19:1)
(17) 60% linoleic acid glyceryl phthalate
(18) 70% linolenic acid glyceryl phthalate The percentages expressed above and in subsequent references to alkyd resins refer to the percentage of oil calculated as the glyceride in the final product at 100% solids. It does not matter whether the modification is by reaction of the oil fatty acid or the oil itself through alcoholysis; the designation will be the same.

The copolymerization of small amounts (½ to 5%) of a monomer of Formula I with methyl methacrylate in the normal casting procedure for making shaped polymeric articles serves to increase the lower limit of temperature at which distortion occurs and also to reduce the susceptibility to solvents. In one preferred manner of operating, the casting may be done under conditions which bring into play substantially only the addition copolymerization reactivity so that the initially obtained casting is still thermoplastic; this casting may then be formed into the ultimately desired shape by heating under conditions which cross-link the copolymer to infusible condition through the reactive groups of the units derived from the compound of Formula I.

To illustrate the utility in blending with other resins an aqueous dispersion of a copolymer of about 1 to 5% by weight of a monomer of Formula I with 0 to 15% by weight of methyl methacrylate and the balance to make 100% of ethyl acrylate or butyl acrylate or a mixture thereof may be formed by emulsion polymerization, a polyvinyl chloride powder (obtained by suspension polymerization) may be mixed into the aqueous dispersion along with a pigment such as titanium dioxide or the like and then the resulting mixture may be sheeted on a two-roll or a three-roll mill immediately or after having its water content reduced by working in a hot blender. The proportion of pigment may range from 5% to 150% by weight of the dispersed copolymer and the amount of dispersed copolymer may range from 5 to 100% by weight of polyvinyl chloride powder. Instead of polyvinyl chloride, there may be used copolymers of vinyl chloride with vinyl acetate and acrylonitrile or polystyrene or copolymers of styrene and acrylonitrile. The films obtained by rolling such mixtures or by extrusion thereof are tough yet flexible and homogeneous. Films obtained in this fashion but with little or no pigment are also useful as laminating films. That is, they can be inserted between thin sheets of wood to form plywood by application of pressure and heat to the assembled layers. Instead of laminating sheets of wood, the films may be used to laminate wood to metal, plastics to metal, metal to metal, or plastics to plastics. The laminated products are characterized by good resistance to separation either in dry or moist condition apparently as the result of the presence in the laminating film of a polymer containing the monomer of the Formula I herein.

The copolymers containing even small amounts of a monomer of Formula I herein, such as 0.5 to 10% by weight based on the copolymer weight, show marked adhesion when applied as coatings or laminating layers to numerous substrates, such as bare steel, aluminum, wood, masonry, concrete, alkyd resins, and so on. It appears that, to attain such adhesiveness, it is essential to avoid excessive size in the A and R in Formula I. When these groups are made appreciably larger than the 4-carbon atom upper limit of size designated herein, the resulting compound loses its adhesion capacity, apparently by virtue of the predominating influence of the large hydrocarbon group or groups reducing the polarity of the branches which project out from the main C-to-C atom "backbone" chain of the polymer.

To assist those skilled in the art to practice the present invention, the following modes of operation are suggested by way of illustration, parts and percentages being by weight and the temperatures in ° C. unless otherwise specifically noted.

(1) Preparation of N,N-di - (carbethoxyethyl) - N'-methacrylylmethylenediamine: To a two-liter, three-necked flask equipped with stirrer, thermometer, water separator, and reflux condenser is charged N-methylolmethacrylamide (173 gms.; 1.5 moles), N,N-di-(carbethoxyethyl)amine (326 gms.; 1.5 moles), benzene solvent (326 gms.), and para-methoxyphenol (0.5 gm.) as polymerization inhibitor. The mixture is stirred and refluxed for about 10 hours during which time a total of 27 gms. of water is collected by the water separator. The benzene is then stripped off under vacuo to constant weight at a pot temperature of 100° C. The batch is cooled, filter-aid (Celite 545, 8 gms.) added, the mixture stirred for 15 minutes, and filtered. The desired compound is recovered as a straw colored, viscous liquid, $n_D^{20}$, 1.4777.

*Analysis.*—Bromine number (M. Eq. Br/gm. sample): Found: 6.26. Calcd.: 6.36. Percent nitrogen found: 8.94. Calcd.: 8.9.

(2) The monomer obtained in (1) above is homopolymerized by refluxing in benzene solution with 0.5% (wt. percent on the monomer) azobisisobutyronitrile.

(3) A solution copolymer composition is prepared in the following manner. Toluene (233 gms.) is charged to a glass polymerization flask equipped with a stirrer, reflux condenser, thermometer, and dropping funnel. The toluene is stirred and heated to 110° C. A monomer-catalyst solution consisting of

| | Gms. |
|---|---|
| n-Butyl methacrylate | 203.7 |
| Methyl methacrylate | 135.8 |
| N,N-di-(carbethoxyethyl)-N'-methacrylyl-methylenediamine | 10.5 |
| Azobisisobutyronitrile (AIBN) | 1.4 | is then added to the flask at an even rate over a two-hour period with continued stirring and heating at 110–115° C. A catalyst solution of 1.58 gms. of azobisisobutyronitrile in 53 gms. of toluene is added to the batch in three equal portions, two, three, and four hours after the addition of the monomer mixture is completed. The mixture is then heated an additional two hours, cooled, and diluted with more toluene (180 gms.). The final solution contains about 40% solids and has a Brookfield viscosity of 265 cps. at 25° C. (spindle No. 2; 60 r.p.m.).

(4) A solution copolymer composition is prepared in the following manner. Xylene (233 gms.) is charged to the equipment described in (3) above and heated to 100° C. A monomer-catalyst solution consisting of

| | Gms. |
|---|---|
| Isobutyl methacrylate | 325.5 |
| N,N-di-(carbethoxyethyl)-N'-methacrylyl-methylenediamine | 17.5 |
| AIBN | 1.75 | is then added to the flask at an even rate over a two-hour period with continued stirring and heating at 100–115° C. Two hours after all the monomer-catalyst solution has been added, an additional catalyst solution of 0.7 gm. of azobisisobutyronitrile in 30 gms. xylene is added and the solution heated for another hour. At this time, another 0.35 gm. of AIBN in 15 gms. xylene is added. The batch is heated an additional two hours, cooled, and diluted with more xylene (150 gms.). The final solution contains about 45% solids and has a Brookfield viscosity of 420 cps. at 25° C.

(5) The solution copolymer prepared in (3) above is applied to steel primed with a semi-gloss iron oxide-pigmented alkyd coating (made with a medium length (55% oil) soyabean oil-modified polyester of phthalic anhydride (33%), pentaerythritol, and propylene glycol) and baked for an hour at 200° F. A well-adhered, tough coating is obtained.

(6) An emulsion copolymer composition is prepared as follows. To a one-liter, three-necked, round-bottom flask fitted with a reflux condenser, thermometer, Teflon blade agitator, and nitrogen inlet is charged water (570 gms.), t-octylphenoxy-poly(40)ethoxyethanol (17 gms. of 70% solution), ethyl acrylate (132 gms.), methyl methacrylate (64 gms.), and N,N-di-(carbethoxyethyl)-N'-methacrylylmethylenediamine (4 gms.), in that order. The system is swept with nitrogen and the temperature adjusted to 15° C. with an ice bath. Polymerization is initiated by the addition of freshly prepared solutions of ammonium persulfate (0.2 gm. in 10 mls. $H_2O$), sodium hydrosulfite (0.2 gm. in 10 mls. $H_2O$), and ferrous sulfate (2.0 mls. of 0.1% aqueous solution of $FeSO \cdot 7H_2O$) in the given sequence. The polymerization exotherm carries the batch temperature to 60° C. in about 15 minutes. When the batch temperature drops 10° C. (air cooling only), an ice bath was applied and the dispersion cooled to room temperature. The dispersion solids are 24.8%.

(7) The copolymer dispersion obtained in (6) is applied to panels of wood, aluminun, steel, alkyd-primed steel, and to cinder block, asbestos-cement shingles, and stucco. The coating dries rapidly in ambient air to form clear, continuous, adherent protective films on these substrates.

(8) A white water-base paint made from the dispersion obtained in (6) above using titanium dioxide pigment adheres well to wood and masonry surfaces.

(9) To prepare N,N - di(carbomethoxymethyl)-N'- acrylylmethylenediamine, the procedure of (1) is repeated, using 245 gms. of N,N-di-(carbomethoxymethyl) amine and 152 gms. of N-methylolacrylamide.

(10) A 40% solution of a copolymer is prepared by the procedure of (3) above using the following monomer-catalyst solution:

| | Gms. |
|---|---|
| Styrene | 110 |
| Methyl methacrylate | 50 |
| Ethyl acrylate | 140 |
| N,N-(dicarbomethoxymethyl) - N' - acrylylmethylenediamine | 25 |
| β-Hydroxyethyl methacrylate | 15 |
| Methacrylic acid | 10 |

(11) 100 gms. of the solution obtained in (10) is mixed with a paste formed of 20 gms. of titanium dioxide, 0.2 gm. of the ammonium salt of a 1:1 mol ratio copolymer of diisobutylene and maleamic acid, and 10 ml. of xylene. The resulting pigmented copolymer solution is diluted to suitable spray viscosity with xylene and it is then sprayed on panels of cold-rolled steel, steel primed with a commercial alkyd primer, steel primed with a commercial polyepoxide resin primer, and aluminum, air-dried, and then baked at 150° for half an hour. Continuous, glossy, white protective coatings are obtained.

(12) To prepare N,N-di(carbobutoxyethyl)-N'-methacrylylmethylenediamine the procedure of (1) is repeated, using 412 gms. of N,N-di-(carbobutoxyethyl)amine.

(13) An aqueous dispersion containing about 25% of an emulsion copolymer is prepared by the procedure of (6) above replacing the monomers there used with the following monomers added in the order stated:

| | Gms. |
|---|---|
| Acrylonitrile | 100 |
| Butyl acrylate | 70 |
| N-methylolacrylamide | 8 |
| Methacrylic acid | 2 |
| N,N-(carbobutoxyethyl) - N' - methacrylylmethylenediamine | 20 |

(14) A mixture is prepared from 100 parts of the copolymer dispersion of (13) above and 40 parts of a 50% solution in water of a methylated melamine/formaldehyde condensate. Copper wires are passed through the resulting aqueous composition. The coated wires are then passed through a tunnel drier wherein they are subjected to a temperature of 200° C. for a period of three minutes. The coatings are effective for electrically insulating and protecting the wires from corrosive attack by humid atmospheres.

(15a) 300 parts of the 45% copolymer solution of (4) above is mixed with 675 parts of a 60% solution in mineral thinner of an oil-modified alkyd of the composition 55% soyabean oil, 33% phthalic anhydride, pentaerythritol and propylene glycol.

(15b) 300 parts of the 45% copolymer solution of (4) above is mixed with 225 parts of the same 60% oil-modified alkyd as used in part (a).

(15c) 300 parts of the 45% copolymer solution of (4) above is mixed with 75 parts of the same 60% oil-modified alkyd as used in part (a).

(15d) 300 parts of the 45% copolymer solution of (4) above is mixed with 675 parts of a 60% solution in mineral thinner of an oil-modified alkyd of the composition 65% soyabean oil, 25.4% phthalic anhydride, and pentaerythritol.

(15e) 300 parts of the 45% copolymer solution of (4) above is mixed with 225 parts of the same 60% oil-modified alkyd as used in part (d).

(15f) 300 parts of the 45% copolymer solution of (4) above is mixed with 75 parts of the same 60% oil-modified alkyd as used in part (d).

(15g) The compositions obtained in parts (a) through (f) inclusive hereof are coated and baked on panels of cold-rolled steel, steel primed with a commercial alkyd resin primer, steel primed with a commercial epoxy resin primer, aluminum, and glass. The coatings are air-dried and then baked at 150° C. for half an hour. The films formed thereby are clear and glossy, showing good compatibility between the alkyd and copolymer components.

I claim:
1. As a composition of matter, a compound of the formula

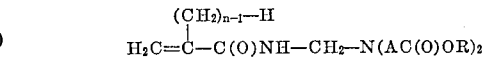

wherein
*n* is an integer having a value of 1 to 2,
R is a (C₁-C₄)-alkyl group, and
A is a (C₁-C₃)-alkylene group.

2. As a composition of matter, a polymer of a compound as defined in claim 1.

3. As a composition of matter, a copolymer of at least one compound of the formula

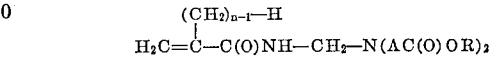

wherein
*n* is an integer having a value of 1 to 2,
R is a (C₁-C₄)-alkyl group, and
A is a (C₁-C₃)-alkylene group,
with at least one other copolymerizable ethylenically unsaturated compound having a group of the formula

4. As a composition of matter, a copolymer of about 0.2 to 99.8% by weight of at least one compound of the formula

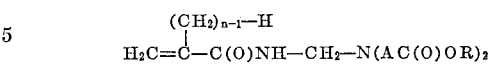

wherein
*n* is an integer having a value of 1 to 2,
R is a (C₁-C₄)-alkyl group, and
A is a (C₁-C₃)-alkylene group,
with at least one other copolymerizable ethylenically unsaturated compound having a group of the formula

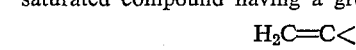

5. N,N-di-(carboethoxyethyl) - N' - methacrylylmethylenediamine.

6. As a composition of matter, a polymer of a compound as defined in claim 5.

7. As a composition of matter, a copolymer of about 0.2 to 99.8% by weight of N,N-di-(carboethoxyethyl)-N'-methacrylylmethylenediamine with at least one other copolymerizable ethylenically unsaturated compound having a group of the formula $H_2C{=}C{<}$.

8. As a composition of matter, a blend of (a) 1 to 99% by weight of a linear solid, resinous condensation product selected from the group consisting of polyester, polyamide, and polyester-polyamide condensation products and (b) 99 to 1% respectively of a copolymer of at least 3% by weight of a compound of the formula

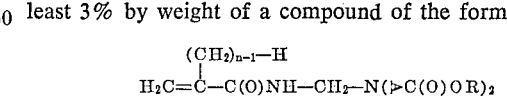

wherein
*n* is an integer having a value of 1 to 2,
R is a (C₁-C₄)-alkyl group, and
A is a (C₁-C₃)-alkylene group,
with at least one other copolymerizable ethylenically unsaturated compound having a group of the formula

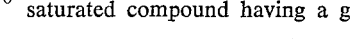

9. As a composition of matter, a blend of (a) 1 to 99% by weight of an oil-modified alkyd resin and (b)

99 to 1% respectively of a copolymer of at least 3% by weight of a compound of the formula $$H_2C=\overset{(CH_2)_{n-1}-H}{\underset{|}{C}}-C(O)NH-CH_2-N(AC(O)OR)_2$$

wherein $n$ is an integer having a value of 1 to 2,
R is a $(C_1-C_4)$-alkyl group, and
A is a $(C_1-C_3)$-alkylene group, with at least one other copolymerizable ethylenically unsaturated compound having a group of the formula $$H_2C=C<$$

References Cited

UNITED STATES PATENTS 2,894,023  7/1959  Rubin _____ 260—482
3,314,927  4/1967  Kelley _____ 260—89.7

DONALD E. CZAJA, *Primary Examiner.*
LEON J. BERCOVITZ, *Examiner.*
R. W. GRIFFIN, *Assistant Examiner.*